(12) United States Patent
Zhao et al.

(10) Patent No.: US 11,791,462 B2
(45) Date of Patent: Oct. 17, 2023

(54) MODIFIED SILICON MONOXIDE MATERIAL FOR USE IN NEGATIVE ELECTRODE OF LITHIUM-ION BATTERY AND PREPARATION METHOD THEREFOR

(71) Applicant: JIANGXI IAMETAL NEW ENERGY TECHNOLOGY CO., LTD, Jiangxi (CN)

(72) Inventors: Anguang Zhao, Jiangxi (CN); Fengshu Yue, Jiangxi (CN); Jun Yao, Jiangxi (CN)

(73) Assignee: JIANGXI IAMETAL NEW ENERGY TECHNOLOGY CO., LTD, Jiangxi (CN)

( * ) Notice: Subject to any disclaimer, the term of this patent is extended or adjusted under 35 U.S.C. 154(b) by 19 days.

(21) Appl. No.: 17/753,301

(22) PCT Filed: Mar. 14, 2020

(86) PCT No.: PCT/CN2020/079393
§ 371 (c)(1),
(2) Date: Feb. 25, 2022

(87) PCT Pub. No.: WO2021/128603
PCT Pub. Date: Jul. 1, 2021

(65) Prior Publication Data
US 2022/0223857 A1 Jul. 14, 2022

(30) Foreign Application Priority Data
Dec. 27, 2019 (CN) .......................... 201911375264.4

(51) Int. Cl.
*H01M 4/48* (2010.01)
*H01M 4/62* (2006.01)
(Continued)

(52) U.S. Cl.
CPC .......... *H01M 4/48* (2013.01); *H01M 4/0428* (2013.01); *H01M 4/625* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2005/0084439 A1  4/2005  Imamura et al.
2013/0280612 A1  10/2013  Lee et al.

FOREIGN PATENT DOCUMENTS

CN  102447112 A  5/2012
CN  103280560 A  9/2013
(Continued)

*Primary Examiner* — Zhongqing Wei
(74) *Attorney, Agent, or Firm* — NKL Law; Allen Xue

(57) ABSTRACT

A modified silicon monoxide material is used for a negative electrode of a lithium battery, and is prepared by reacting raw materials of silicon, silicon dioxide and metal silicate under high-temperature and vacuum conditions to prepare silicon monoxide; and meanwhile, reacting the metal vapor with silicon monoxide in the preparation process to in situ form metal silicate. In the modified silicon monoxide material, the metal silicate is uniformly dispersed around the silicon and the silicon monoxide to form silicon-containing particles, and a carbon material coats the surfaces of the silicon-containing particles.

10 Claims, 8 Drawing Sheets

(51) Int. Cl.
*H01M 10/0525* (2010.01)
*H01M 4/04* (2006.01)
*H01M 4/02* (2006.01)

(56) References Cited

FOREIGN PATENT DOCUMENTS

| | | | |
|---|---|---|---|
| CN | 105283986 A | | 1/2016 |
| CN | 106356508 A | * | 1/2017 ........ H01M 10/0525 |
| CN | 106356508 A | | 1/2017 |
| CN | 106876687 A | | 6/2017 |
| CN | 107546378 A | | 1/2018 |
| CN | 108183200 A | | 6/2018 |
| CN | 109560278 A | | 4/2019 |
| CN | 110024188 A | | 7/2019 |
| CN | 110615423 B | | 12/2020 |
| JP | 2019169354 A | | 10/2019 |

* cited by examiner

MODIFIED SILICON MONOXIDE MATERIAL FOR USE IN NEGATIVE ELECTRODE OF LITHIUM-ION BATTERY AND PREPARATION METHOD THEREFOR

FIELD

The present disclosure belongs to the technical field of batteries, and particularly relates to modified silicon monoxide, a preparation method of the modified silicon monoxide, a battery negative electrode containing the modified silicon monoxide and a lithium-ion battery.

BACKGROUND

Since a lithium-ion battery is popularized to the market by Sony Company in 1991, the lithium-ion battery has become the most important energy storage equipment at present due to its advantages of high mass energy density, high volume energy density, high power density, long cycle life, low self-discharge rate and the like. The lithium-ion battery has very important application in the field of consumer electronics such as notebook computers, mobile phones and medical electronic equipment, also shows application advantages in the field of electric vehicles in recent years, and is a green and environment-friendly substitute of non-renewable petroleum resources. In addition, the lithium-ion battery is an ideal storage device for intermittent renewable resources such as solar energy, wind energy and tidal energy, and the problems of environmental pollution and the like caused by traditional energies can be relieved. However, the energy density of the current lithium-ion battery is about 210 Wh/kg, and the endurance mileage of an electric vehicle using the lithium-ion battery is greatly different from the endurance mileage of a traditional fuel vehicle. The high cost and poor cycle performance also hinder application in large-scale energy storage and renewable energy storage systems.

At present, the most mature lithium-ion battery is prepared by taking graphite of which the theoretical specific capacity is 372 mAh/g as a negative electrode and taking lithium metal oxides such as $LiCoO_2$, $LiMn_2O_4$, $LiFePO_4$, $LiCo_{1/3}Mn_{1/3}Ni_{1/3}O_2$ and the like of which the theoretical specific capacity is less than 200 mAh/g as a positive electrode. Along with continuous and deep research on a positive electrode material and upgrading of the positive electrode material, a next generation of negative electrode material with ultrahigh capacity, such as a silicon-based negative electrode material, is also gradually developed, and the theoretical specific capacity of the silicon-based material can reach 4200 mAh/g, so that the energy density of the battery is expected to be greatly improved. However, practical application of a silicon-based negative electrode is also faced with huge challenges, for example, about 300% of volume change and an unstable solid electrolyte interface (SEI) exist in the charging and discharging process, and the cycling stability and the service life of the silicon-based material can be seriously reduced. Although scientific researchers have designed a large number of nano structures, coating structures, binders and various additives and made progress to a certain extent, huge volume change, unstable SEI and irreversible lithium consumption generally exist in a silicon-based battery, so that the practical application of the silicon-based negative electrode is seriously influenced.

When the energy density of the battery is calculated as a function of the specific capacities of the positive electrode material and the negative electrode material, it is assumed that when the specific capacity of the positive electrode material is 200 mAh/g, if the specific capacity of the negative electrode material exceeds 2500 mAh/g, the influence on the overall energy density is small. For this consideration, the silicon monoxide negative electrode has a very high application value, the initial specific discharge capacity of the silicon monoxide negative electrode is 2200-2500 mAh/g, Li reacts with silicon monoxide in the charging and discharging process to irreversibly generate $Li_2O$ and lithium silicate, and a buffering effect on volume expansion of lithium-silicon alloy is achieved, so that the silicon monoxide negative electrode has a longer cycle life than a silicon material. However, the irreversible Li consumption severely reduces the initial Coulombic efficiency when silicon monoxide is used as a negative electrode material, and the volume expansion (about 200%) of silicon monoxide cannot be effectively reduced only by means of a buffer layer of $Li_2O$ and lithium silicate formed in the first charging and discharging process. Recently, the initial Coulombic efficiency of silicon monoxide is effectively improved through a pre-lithiation method in many researches, and the pre-lithiation can effectively eliminate oxygen components irreversibly consuming lithium ions in the silicon monoxide in the first charging and discharging process, so that the loss of active lithium ions during first intercalation is reduced. However, the pre-lithiation method is generally carried out on a prepared silicon monoxide material, an inactive component oxygen in the silicon monoxide material is difficult to effectively eliminate, and silicon monoxide is relatively compact in structure, so that the effect of pre-lithiation on inhibiting and relieving volume expansion of a negative electrode is not obvious.

In the prior art, silicon, silicon dioxide, magnesium powder and other metals are mixed in advance, then heating is performed to generate silicon monoxide steam and steam with a reducing metal, and deposition for a chemical reaction is performed to obtain a system containing silicon, silicon monoxide and metal silicate. However, according to the method, the process conditions are difficult to control, the evaporation speeds of silicon oxide steam and metal (such as magnesium and lithium) steam are different, the contents of silicate in materials obtained at different time in a deposition zone are different, the silicate dispersion is not uniform enough, and the obtained system is not uniform enough, so that the performance of the battery is influenced.

The inventor's previous patent application No. "201910907245.5" discloses a preparation method of a silicon-based composite negative electrode material for a lithium battery, wherein in order to enable magnesium silicate to be deposited and permeated more uniformly, the adopted technical means is that a material capable of reacting with silicon oxide to form a silicate contains a part of alloy; meanwhile, a silicon-based material and a metal substance are respectively heated to form steam in two or more heating furnaces, and uniform permeation of the silicate is realized by controlling the flow rate of the steam. However, according to the method, uniform deposition can be achieved only by finely controlling the heating conditions and the flow rates of the two heating furnaces, and industrial large-scale production is not facilitated.

Therefore, a method for dispersing the silicate in the silicon-based negative electrode material more uniformly and stably needs to be developed urgently, so that the electrochemical performance of the lithium-ion battery can be further improved.

SUMMARY

The present disclosure aims to solve the problems of poor cycle performance and low initial Coulombic efficiency of a lithium battery caused by non-uniform and non-stable dispersion when the existing lithium battery negative electrode material is doped with a silicate, and provides a modified silicon monoxide material for a negative electrode of a lithium-ion battery and a preparation method of the modified silicon monoxide material. Specifically, the preparation method is realized by in situ doping a metal silicate in a silicon monoxide preparation process, in the modified silicon monoxide material, the metal silicate is uniformly dispersed around silicon and silicon monoxide to form silicon-containing particles, and a carbon material coats the surfaces of the silicon-containing particles and permeates into pores of the silicon-containing particles. Silicate which is uniformly dispersed inside is formed by reacting with oxygen in silicon monoxide, and an inactive component oxygen in the material is consumed in advance, so that the consumption of active lithium ions in the first charging and discharging process is effectively reduced, and the Coulombic efficiency of the first charging and discharging is improved; in the modified silicon monoxide material, metal silicate is uniformly dispersed around silicon and silicon monoxide to form silicon-containing particles, and the uniformly dispersed silicate is in situ introduced in the preparation process of the modified silicon monoxide material and can separate effective components which react with lithium ions in the silicon monoxide, so that the overall volume expansion rate of the material is reduced; and inevitable agglomeration of silicon particles in the subsequent charging and discharging process is reduced, a better buffering effect is achieved, and the cycle life of a negative electrode material for the lithium ion battery is effectively prolonged.

A first purpose of the present disclosure is to provide a modified silicon monoxide material for a negative electrode of a lithium battery, and the modified silicon monoxide material is prepared by reacting raw materials of silicon, silicon dioxide and metal silicate under high-temperature and vacuum conditions to prepare silicon monoxide; and meanwhile, reacting the generated metal steam with silicon monoxide to in situ dope metal silicate; in the modified silicon monoxide material, the metal silicate is uniformly dispersed around the silicon and the silicon monoxide to form silicon-containing particles, and a carbon material coats the surfaces of the silicon-containing particles.

The metal silicate is magnesium and/or lithium silicate, and a specific chemical formula of the metal silicate includes but is not limited to one or more of $Li_2Si_5O_{11}$, $Li_6Si_2O_7$, $Li_8SiO_6$, $Li_2Si_2O_5$, $Li_2SiO_3$, $Li_4SiO_4$, $Mg_2Si_3O_8$, $MgSiO_3$ and $Mg_2SiO_4$, preferably, a compound of $MgSiO_3$ and $Li_2Si_2O_5$.

The compound of $MgSiO_3$ and $Li_2Si_2O_5$ is a compound of $MgSiO_3$ and $Li_2Si_2O_5$ according to a mass ratio of (4-6):(1-2).

A certain proportion of lithium silicate and magnesium silicate also exist in a product at the same time, magnesium silicate can effectively buffer volume expansion, and lithium silicate can ensure transmission of lithium ions in the modified silicon monoxide material.

The carbon coating means that the carbon material coats the surfaces of the silicon-containing particles through vapor deposition and permeates into the pores of the silicon-containing particles, the thickness of a formed carbon coating layer is 1-20 nm, and preferably, the thickness of the carbon coating layer is 5-15 nm.

Preferably, in terms of the total mass of the modified silicon monoxide being 100%, the mass percentage content of the carbon coating layer is 2-10 wt %, more preferably, 4-8 wt %.

Specifically, when the mass percentage content of the carbon coating layer is lower than 2%, an effective carbon coating effect cannot be achieved, the electronic conductivity of the negative electrode material cannot be effectively improved, the electric contact of the material becomes poor, and the capacity cannot be normally exerted; when the mass percentage content of the carbon coating layer is higher than 10%, the thickness of the carbon coating layer is too large, rapid transmission of lithium ions is not facilitated, the specific surface area of the modified silicon monoxide material is obviously increased, side reactions of the modified silicon monoxide material with an electrolyte are increased, and the initial Coulombic efficiency of the modified silicon monoxide material is reduced.

A second purpose of the present disclosure is to provide a preparation method of the modified silicon monoxide material, including the following steps:

(1) uniformly mixing raw materials of silicon, silicon dioxide and metal silicate and water, performing spray drying to obtain raw material microspheres with uniformly distributed components, pressing the raw material microspheres into blocks, and drying;

(2) loading the raw material blocks formed by pressing into vacuum furnace equipment with a condensation collection system, heating under a high-temperature reduced-pressure condition to evaporate the raw material blocks, condensing and depositing, and crushing the deposited blocks to prepare silicon-containing particles; and (3) carrying out carbon coating on the silicon-containing particles to form a carbon coating layer so as to obtain the modified silicon monoxide material.

The uniform mixing method in the step (1) can be liquid-phase ball milling, specifically, ball milling is carried out for 2-5 h at a rotating speed of 500-1000 r/min, and finally a slurry with a solid content of 15-30% is obtained.

Preferably, a usage ratio of the raw materials of silicon, silicon dioxide and silicate in the step (1) meets the requirement that a molar ratio of silicon to oxygen is 1:(0.6-1.4), preferably 1:(0.8-1.2). When the molar ratio of silicon to oxygen in the raw materials is greater than 1:0.6, the silicon is excessive, so that more silicon is not utilized in the material preparation process, and the reaction efficiency is low; and when the molar ratio of silicon to oxygen in the raw materials is less than 1:1.4, too much oxygen in the raw materials enables the amount of generated silicon monoxide to be less and the yield to be lower, and the oxygen content of the modified silicon monoxide obtained by the reaction is too high, so that the initial Coulombic efficiency of the obtained modified silicon monoxide material is lower.

Further preferably, a molar ratio of silicon to metal elements in the silicate in a raw material combination is 1:0.02-1:0.2, preferably 1:0.05-1:0.15.

When the molar ratio of silicon to the metal elements in the silicate in the raw material combination is greater than 1:0.02, the amount of doped silicate is too small, and the effects of buffering volume expansion and improving the initial Coulombic efficiency cannot be achieved; and when the molar ratio of silicon to the metal elements in the silicate in the raw material combination is less than 1:0.2, the amount of the doped silicate is too large, the specific capacity of the modified silicon monoxide material can be seriously reduced.

In the step (2), a heating system of a vacuum furnace enables the temperature of a material reaction zone to reach 1200-1500° C., preferably 1300-1400° C., a vacuum system can control the vacuum degree of the whole reaction zone and a deposition zone to be 1-50 Pa, preferably 5-20 Pa, and the temperature of a condensing and depositing zone can be controlled to be 400-700° C., preferably 500-600° C.

In the step (2), silicon monoxide gas and another one or more gases for modifying silicon monoxide can be generated along with reaction among the raw materials during evaporation of the raw materials, and the gases are generally gases for modifying metal components in silicate in the silicon monoxide.

Preferably, heat treatment is performed before crushing in the step (2) so as to further enable active metal components to generate a silicate, the heat treatment may use static sintering or dynamic sintering, and equipment such as a box-type furnace, a pushed slab kiln and a rotary furnace with atmosphere protection, heating is conducted to 600-900° C., heat preservation is conducted for 0.5-3 h, and then crushing and other treatment are conducted.

Optionally, the pressing into blocks in the step (1) means that the powder material obtained by spray drying is pressed by hydraulic forming equipment, so that the components are in close contact, and a subsequent reaction is facilitated; the drying can be performed at 50-100° C. for 0.5-5 h by using equipment such as a blast drying oven, a vacuum drying oven, drum-type drying equipment and a rotary furnace so as to fully remove moisture, and drying methods such as freeze drying and flash drying can also be used.

Optionally, the crushing in the step (2) can crush the blocky material obtained by deposition into a proper particle size through common crushing modes such as ball milling, sand milling, mechanical crushing, airflow crushing and the like.

Optionally, preferably, the carbon coating in the step (3) is realized by a chemical vapor deposition method, and a carbon source of the chemical vapor deposition method can be one or a combination of more of acetylene, methane, propane and ethylene. During carbon coating, pretreatment is performed by hydrogen or hydrogen-argon mixed gas before carbon source gas is introduced, wherein the proportion of hydrogen in the hydrogen-argon mixed gas is not less than 10%, and the pretreatment is performed at a temperature of not lower than 600° C. and not higher than 1000° C. for 10 min-2 h. The carbon coating in the step (3) is carried out at 600-1000° C., preferably 700-1000° C. for 1-2.5 h. The carbon coating layer in the step (3) is a uniform amorphous carbon layer, a vertically growing graphene sheet layer or a stacked graphene sheet layer.

A third purpose of the present disclosure is to provide application of the modified silicon monoxide material as a negative electrode material in a lithium ion battery.

The principle of the present disclosure is as follows: silicon and silicon dioxide in the raw materials are subjected to a reaction under the conditions of high temperature and low pressure to form silicon monoxide steam, metal silicate can be decomposed into metal vapor and silicon monoxide steam, and the metal vapor reacts with silicon oxide to form a silicate; and finally silicon monoxide and the silicate are deposited together in a condensing and depositing zone to form a silicon monoxide negative electrode material infiltrated with the silicate. By matching the heating temperature and the vacuum degree in the vacuum furnace, the silicate can uniformly and stably permeate into a silicon monoxide material during deposition, so that the electrochemical performance of the negative electrode material is favorably improved, and a carbon material favorably more uniformly coats the surfaces of silicon-containing particles; the electrochemical performance of the assembled and prepared lithium ion battery is improved, and the initial Coulombic efficiency and the cycling stability are obviously improved.

Compared with the prior art, the modified silicon monoxide material provided by the present disclosure has the advantages that:

1. a silicate is dispersed in the prepared modified silicon monoxide, so that the consumption of active lithium ions in the first charging and discharging process can be effectively reduced, the initial irreversible capacity is reduced, and the Coulombic efficiency of the first charging and discharging is improved. According to the modified silicon monoxide, the silicate is in situ dispersed in the material uniformly in the silicon monoxide preparation process, and effective components reacting with lithium ions can be separated, so that the overall volume expansion rate of the material is reduced, the agglomeration of silicon particles in the subsequent charging and discharging process is reduced, and the volume expansion in the charging and discharging process is more effectively inhibited, instead of only by means of the buffer layer formed by subsequent lithiation, so that the prepared modified silicon monoxide has lower volume expansion rate and higher initial Coulombic efficiency.
2. According to the modified silicon monoxide, the surface of the silicon monoxide material can be coated with carbon material more uniformly and stably, so that the conductivity of the material is improved, the rate capability of the composite material is improved, contact sites among particles are increased, and the internal resistance of the electrode plate is reduced. Meanwhile, uniform amorphous or graphene-shaped carbon coating on the surface can buffer stress generated by internal volume expansion to a certain extent, the integrity of particles is maintained, continuous growth of a solid electrolyte interface is reduced, and the cycle life of the material is prolonged.
3. The modified silicon monoxide material with uniformly dispersed silicate and uniformly coated with the carbon material can be obtained only by controlling the raw material ratio and the temperature and vacuum degree of the vacuum furnace through a simple method, and the raw materials are low in price, so that industrial implementation is facilitated, and the modified silicon monoxide has a very wide application prospect.

DETAILED DESCRIPTION OF THE EMBODIMENTS

The present disclosure is further explained in combination with specific embodiments, but the present disclosure is not limited to the following embodiments.

The experimental methods in the following embodiments are conventional methods unless otherwise specified; the reagents and materials can be commercially obtained unless otherwise specified.

A scanning electron microscope (SEM) is an electron scanning electron microscope JEOL-6701F, and a transmission electron microscope (TEM) adopts JEM-2100F.

Embodiment 1

(1) 8.225 kg of silicon powder, 8.625 kg of silicon dioxide, 5 kg of $MgSiO_3$ powder, 2 kg of $Li_2Si_2O_5$ powder and 95 L of water were added into a ball mill, ball milling was performed at a rotating rate of 600 r/min for 3 h to obtain slurry with a solid content of about 20%, then spray drying treatment was carried out on the slurry to form raw material microspheres with uniformly distributed components, the raw material microspheres were pressed into blocks by using a hydraulic forming machine, and then the obtained blocks were dried in a vacuum drying oven at 60° C. for 3 h to obtain raw material blocks;

(2) the raw material blocks formed by pressing were loaded into a heating zone of silicon monoxide preparation equipment, vacuumizing was performed to about 5 Pa, heating was performed at a heating rate of 50° C./min to 1300° C., heat preservation was conducted for 20 h, while maintaining the temperature of a collection zone at 500° C., then cooling was conducted to room temperature, the block material obtained by deposition was taken out, and crushed into coarse particles with a particle size of 0.1-10 mm by using a jaw crusher, then rolling was performed twice by using a roller crusher at an interval of 0.1 mm to further crush the coarse particles to be not greater than 3 mm, then the rolled particles were added into a rotary furnace, heat preservation was conducted at 700° C. for 1 h, then natural cooling was conducted, and crushing was performed by jet milling until a median particle size was about 5 μm; and (3) the crushed particles obtained in the step (2) were added into a CVD (Chemical Vapor Deposition) furnace, heating was performed at a heating rate of 5° C./min to 960° C., then 10% of hydrogen-argon mixed gas was introduced for 0.5 h, then methane was introduced, and carbon coating was carried out on the surface of the material. The electrochemical performance test result of the material obtained in Embodiment 1 is listed in the table 1.

Figure 1:
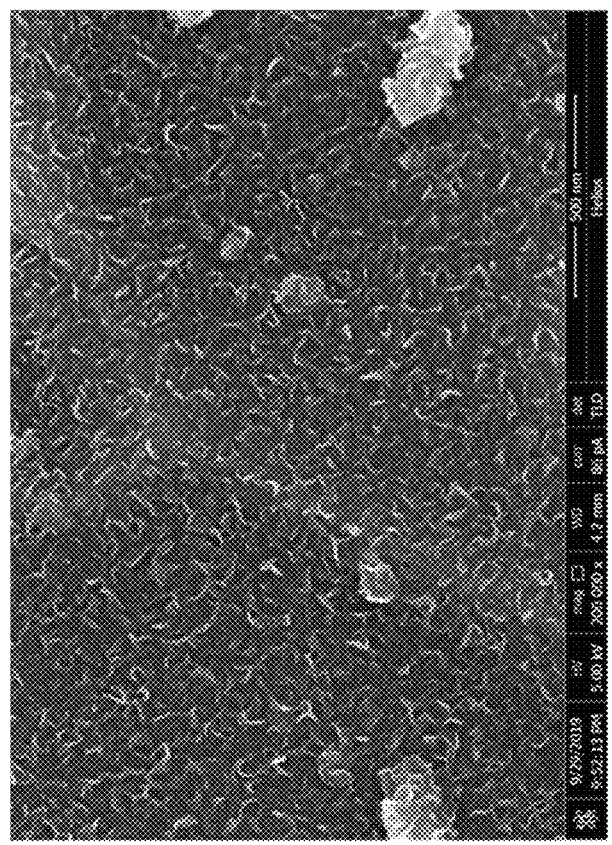
FIG. 1 is a scanning electron microscope picture of a modified silicon monoxide negative electrode material prepared in Embodiment 1.
Figure 1:
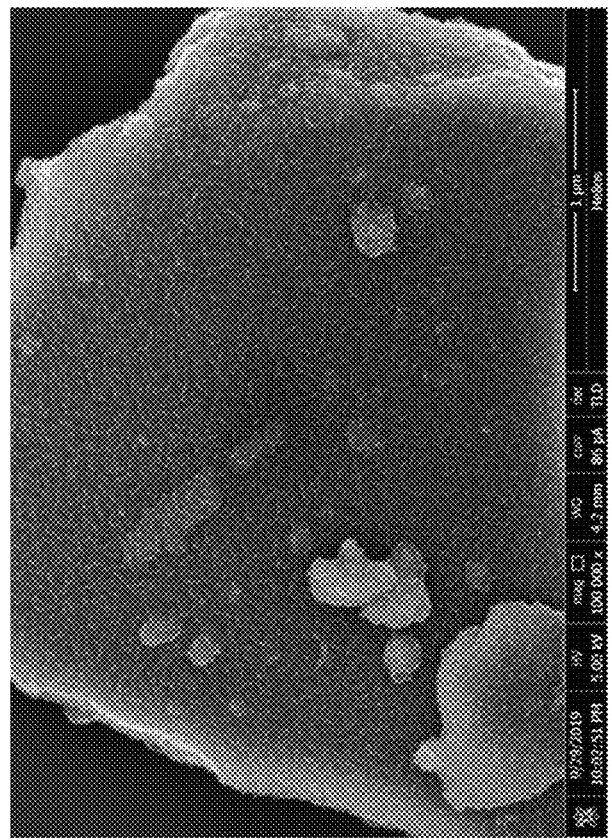

FIG. 1 is a scanning electron microscope image of a modified silicon monoxide material prepared in Embodiment 1, and a particle size is about 5 μm. It can be seen that the surface of the material is coated with a lamellar carbon material, and a lamellar layer of the carbon material grows perpendicular to the surface of the material, so that lithium ions can be intercalated into the material in the charging and discharging process, and the rapid charging and discharging capability of the material is further improved. The vertical lamellar carbon coating can be continuously attached to the surface of the material in the volume expansion process of a silicon-based negative electrode material, so that the stability of a material interface is maintained, and the cycle performance of the material is improved.

Figure 2:
FIG. 2 is a transmission electron microscope picture of the modified silicon monoxide negative electrode material prepared in Embodiment 1.
Figure 2:
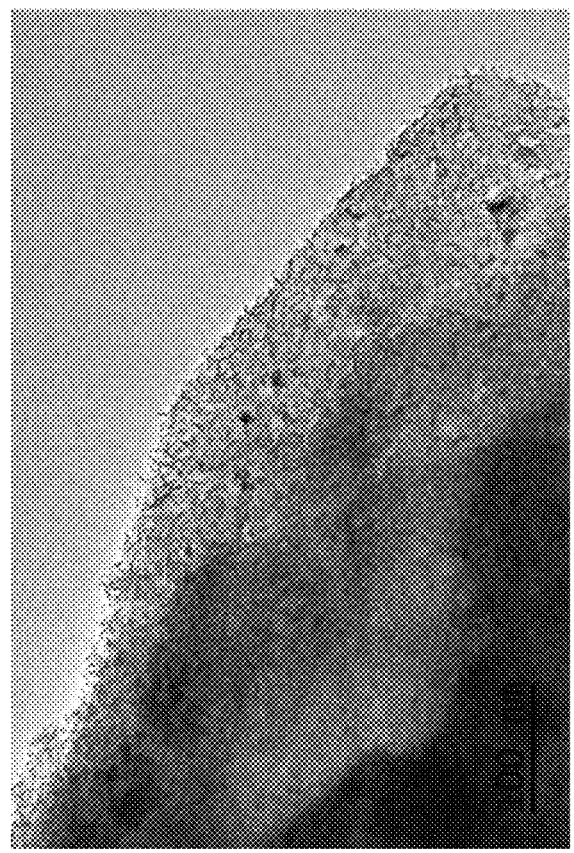

FIG. 2 is a transmission electron microscope image of the modified silicon monoxide material prepared in Embodiment 1, the microstructure of a carbon layer on the surface of the material can be seen, the distribution condition perpendicular to the surface of the material and a graphene-like structure can be seen, and the structure can effectively improve the electronic conductivity of the material and the intercalation speed of lithium ions and improve the stability of the material.

Figure 3:
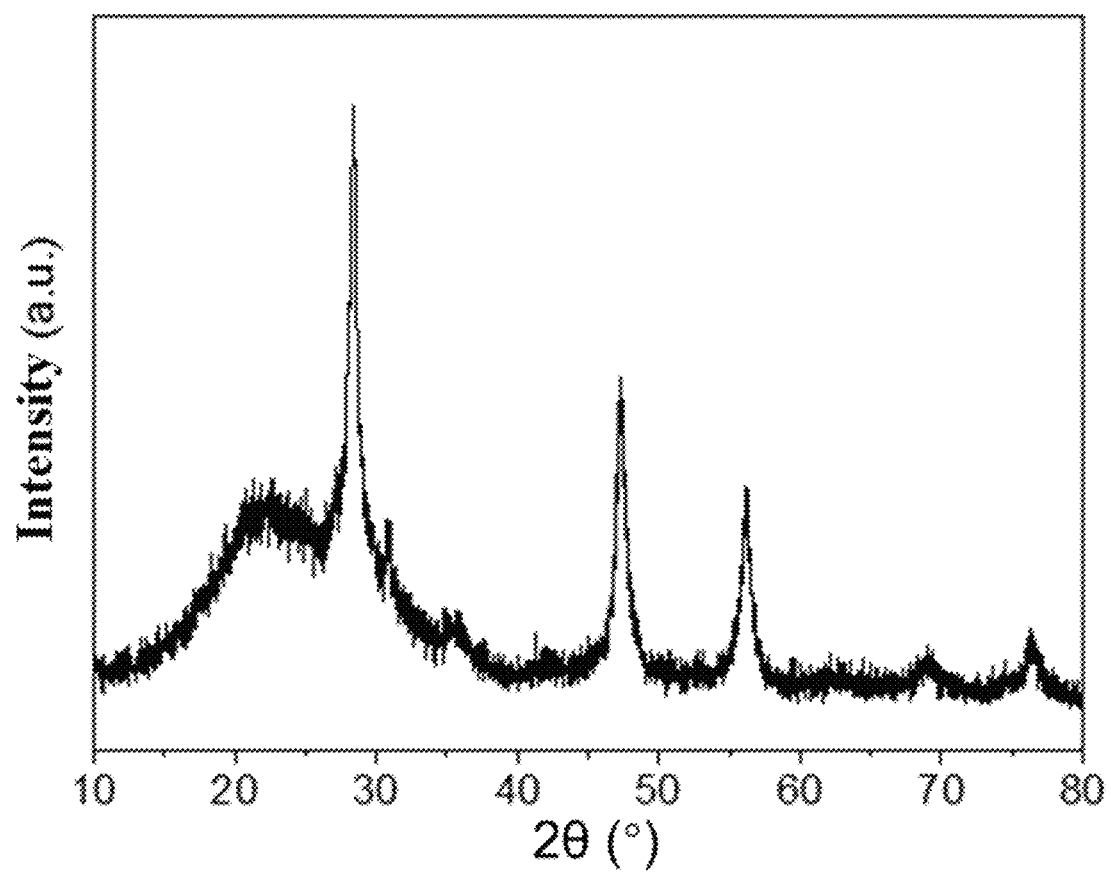
FIG. 3 is an X-ray diffraction pattern of the modified silicon monoxide negative electrode material prepared in Embodiment 1.

The crystallization condition of the composite material is analyzed by using an X-ray diffraction analyzer (XRD, Rigaku D/max 2500, Cu Kα), and FIG. 3 is an XRD diffraction pattern of the modified silicon monoxide material prepared in Embodiment 1. The silicon diffraction peaks appearing at the positions of 28 degrees, 47 degrees and 56 degrees are relatively weak, which indicates that the material has a relatively small silicon crystal region and is beneficial to keeping the material body stable in the charge-discharge cycle process, and the characteristic peaks belonging to magnesium silicate appear at the positions of 31 degrees and 35 degrees, which can prove that magnesium silicate is doped into the material.

Figure 4:
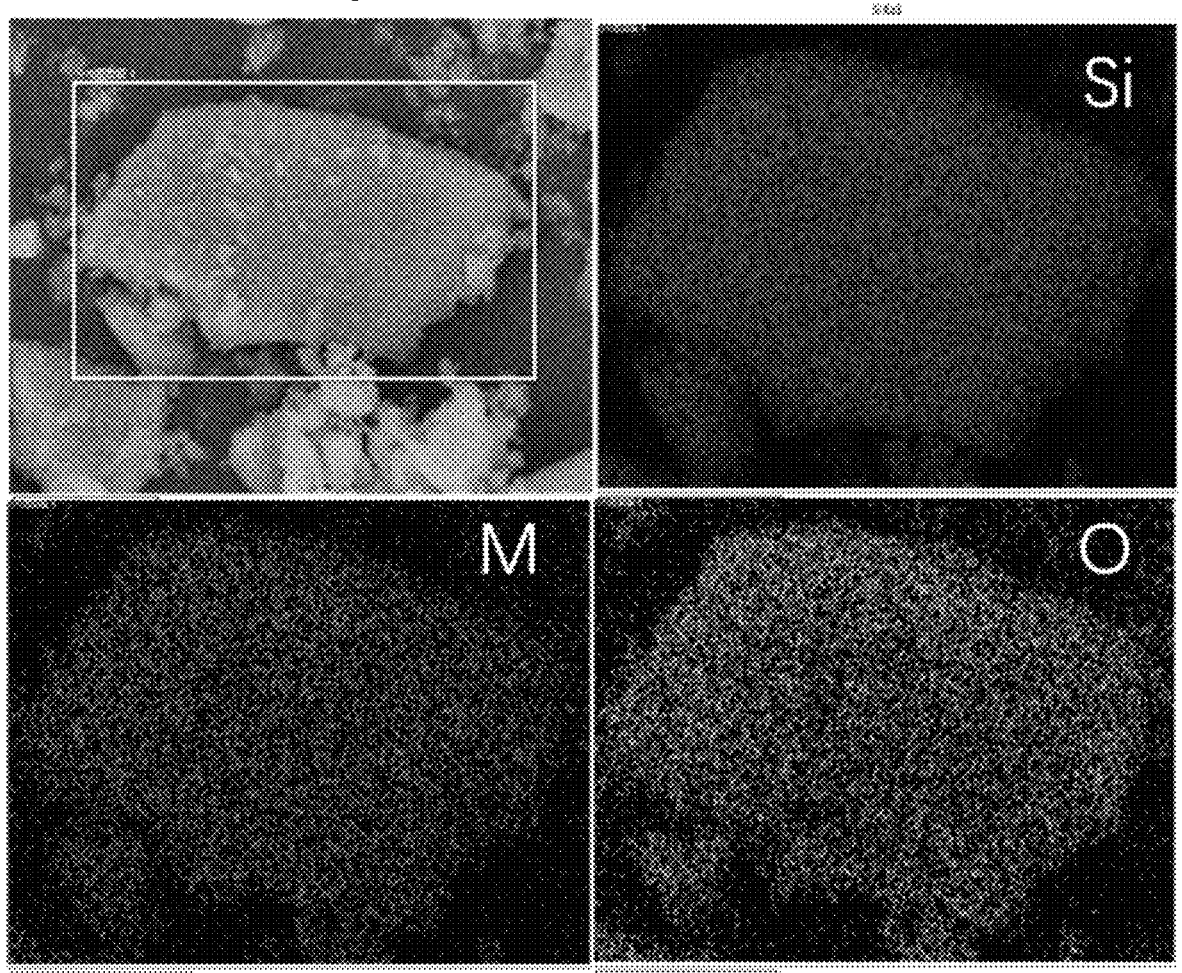
FIG. 4 is scanning electron microscope images of the modified silicon monoxide negative electrode material prepared in Embodiment 1 and an element distribution spectrum of silicon, oxygen and doped elements.

FIG. 4 is an electron microscope image of the modified silicon monoxide material prepared in Embodiment 1 and an element distribution diagram of silicon, oxygen and magnesium, it can be seen that the magnesium element, the silicon element and the oxygen element are evenly dispersed in the corresponding positions of the particles, the magnesium element is evenly distributed in the whole particles, and element signals are even and free of agglomeration.

The particle size of the modified silicon monoxide material was measured by using a Malvern laser particle analyzer (Malvern, Mastersizer 3000) to obtain that a median particle size of the modified silicon monoxide material is 4.9 μm.

Embodiment 2

Other operations were the same as those in Embodiment 1, and the difference was that the usage amounts of the raw materials were changed into 7.5 kg of silicon powder, 10.5 kg of silicon dioxide, 5 kg of $MgSiO_3$ powder and 90 L of water.

Embodiment 3

Other operations were the same as those in Embodiment 1, and the difference was that the usage amounts of the raw materials were changed into 4.9 kg of silicon powder, 7.5 kg of silicon dioxide, 2.5 kg of $Li_2Si_2O_5$ powder and 60 L of water.

Embodiment 4

Other operations were the same as those in Embodiment 1, and the difference was that the usage amounts of the raw materials were changed into 7.7 kg of silicon powder, 12 kg of silicon dioxide, 3.5 kg of $Mg_2SiO_4$ powder and 90 L of water.

Embodiment 5

Other operations were the same as those in Embodiment 1, and the difference was that the usage amounts of the raw materials were changed into 8.05 kg of silicon powder, 10.5 kg of silicon dioxide, 5.25 kg of $Mg_2SiO_4$ powder and 95 L of water.

Embodiment 6

Other operations were the same as those in Embodiment 1, and the difference was that the usage amounts of the raw materials were changed into 7.35 kg of silicon powder, 13.5 kg of silicon dioxide, 1.75 kg of $Mg_2SiO_4$ powder and 90 L of water.

Embodiment 7

Other operations were the same as those in Embodiment 1, and the difference was that vacuumizing was performed to about 20 Pa, heating was started to be performed at a heating rate of 50° C./min to 1400° C., and heat preservation was conducted for 20 h.

Embodiment 8

Other operations were the same as those in Embodiment 1, and the difference was that vacuumizing was performed to about 5 Pa, heating was started to be performed at a heating rate of 50° C./min to 1500° C., and heat preservation was conducted for 20 h.

Embodiment 9

Other operations were the same as those in Embodiment 1, and the difference was that vacuumizing was performed to about 30 Pa, heating was started to be performed at a heating rate of 50° C./min to 1500° C., and heat preservation was conducted for 20 h.

Embodiment 10

Other operations were the same as those in Embodiment 1, and the difference was that the temperature of the condensing and depositing collection zone was 600° C.

Embodiment 11

Other operations were the same as those in Embodiment 1, and the difference was that the temperature of the condensing and depositing collection zone was 400° C.

Embodiment 12

Other operations were the same as those in Embodiment 1, and the difference was that the temperature of the condensing and depositing collection zone was 700° C.

Comparative Example 1

Other operations were the same as those in Embodiment 1, and the difference was that the usage amounts of the raw materials were changed into 7.5 kg of silicon powder, 10.5 kg of silicon dioxide, 1.2 kg of magnesium powder and 70 L of water.

Comparative Example 2

Other operations were the same as those in Embodiment 1, and the difference was that the usage amounts of the raw materials were changed into 7.5 kg of silicon powder, 10.5 kg of silicon dioxide, 2.9 kg of magnesium hydroxide and 70 L of water.

Comparative Example 3

Other operations were the same as those in Embodiment 1, and the difference was that the usage amounts of the raw materials were changed into 7.7 kg of silicon powder, 13.5 kg of silicon dioxide, 1.2 kg of LiOH powder and 90 L of water.

Comparative Example 4

Other operations were the same as those in Embodiment 1, and the difference was that the usage amounts of the raw materials were changed into 8.4 kg of silicon powder, 12 kg of silicon dioxide, 4.2 kg of $MgCO_3$ powder and 100 L of water.

Comparative Example 5

Other operations were the same as those in Embodiment 1, and the difference was that the usage amounts of the raw materials were changed into 7.5 kg of silicon powder, 10.5 kg of silicon dioxide, 0.6 kg of magnesium powder, 0.6 kg of LiOH powder and 100 L of water.

Figure 5:
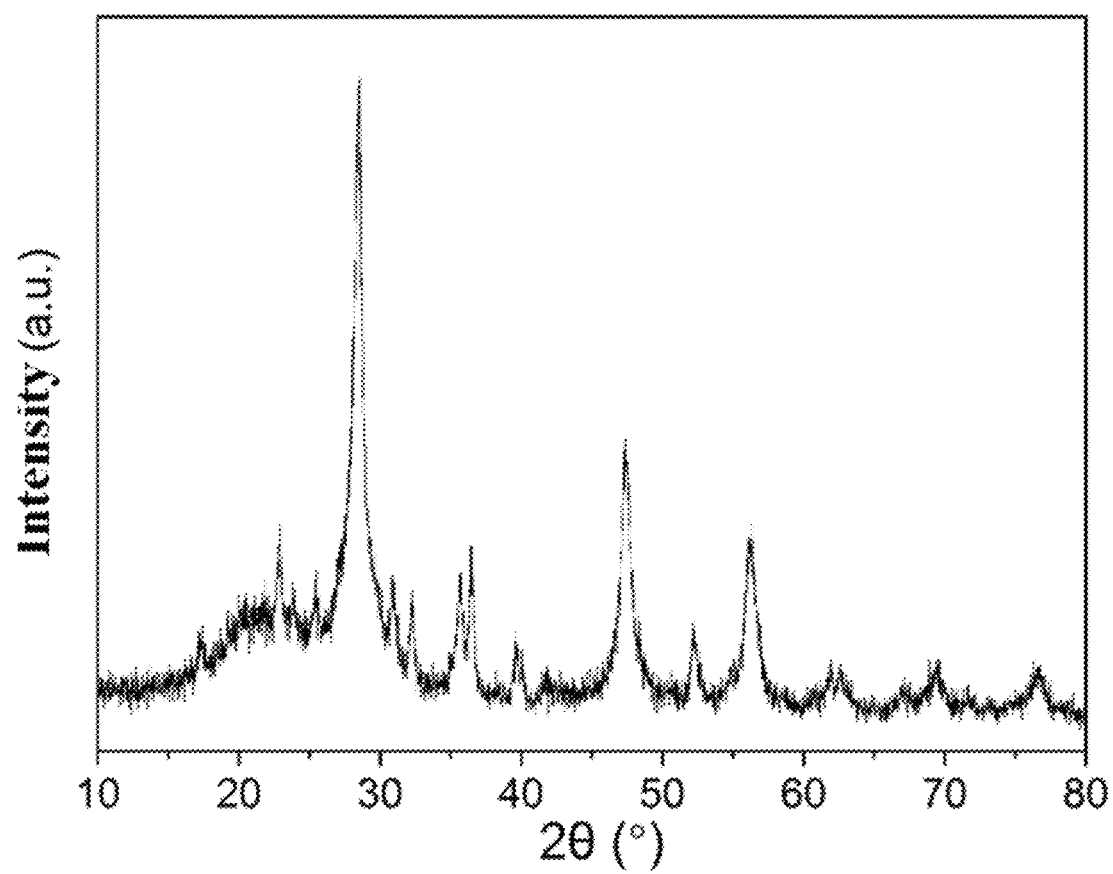
FIG. 5 is an X-ray diffraction pattern of a modified silicon monoxide negative electrode material prepared in Comparative example 5.

The X-ray diffraction pattern is shown in FIG. 5, and it can be seen that the diffraction peaks of magnesium silicate and lithium silicate appear besides the diffraction peaks of silicon appearing at the positions of 28 degrees, 47 degrees and 56 degrees, which proves that the material prepared by the method is doped with magnesium silicate and lithium silicate.

Figure 6:
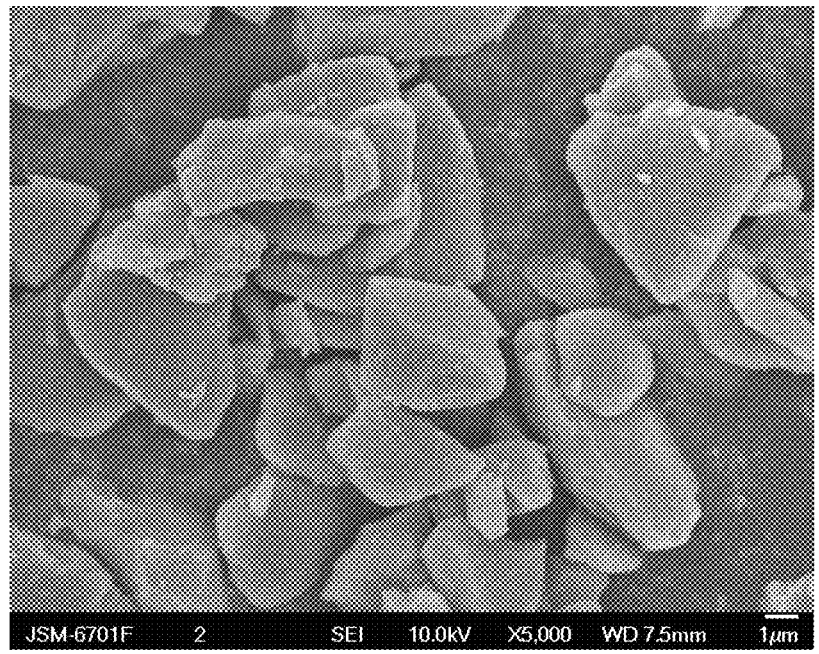
FIG. 6 is a scanning electron microscope image of the modified silicon monoxide negative electrode material prepared in Comparative example 5.

A scanning electron microscope image is shown in FIG. 6, there is a uniform and continuous coating layer on the surfaces of particles and there is no vertical carbon layer structure, and due to the uneven distribution of the silicate formed by doped elements, the material obtained by adopting this comparative example is relatively loose as a whole, and more fine powder is generated in the crushing process.

Figure 7:
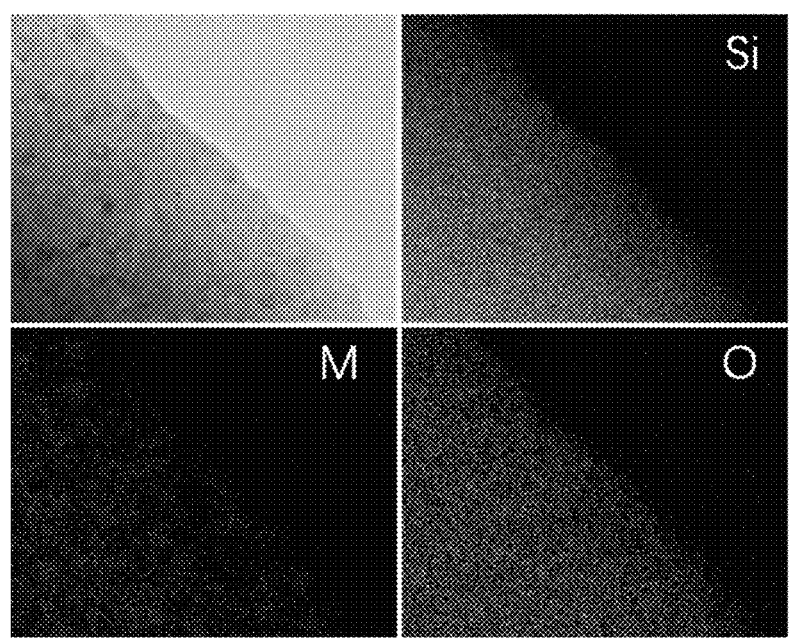
FIG. 7 shown an scanning electron microscope image of the modified silicon monoxide negative electrode material prepared in Comparative example 5 and an element distribution diagram of silicon, oxygen and doped elements.

The electron microscope image of the material obtained according to the comparative example and the distribution diagram of silicon, oxygen and magnesium elements are shown in FIG. 7, it can be seen that although the magnesium element, silicon element and oxygen element are also dispersed in the corresponding positions of particles, the position corresponding to the magnesium element is different from those of silicon and oxygen in which the agglomeration phenomenon occurs, the distribution of the magnesium element is obviously granular, which proved that the doping of the magnesium element obtained through the method is not uniform, and then the electrochemical performance of the negative electrode material is achieved.

Application Example

The electrochemical performance of the silicon-based negative electrode material prepared in Embodiments and Comparative examples was tested according to the following method: the prepared modified silicon monoxide negative electrode material, carbon black and a composite binder of carboxymethyl cellulose (CMC) and styrene butadiene rubber (SBR) were mixed according to a mass ratio of 80:10:10 to prepare slurry (wherein the mass ratio of CMC to SBR is 1:1); a copper foil current collector was uniformly coated with the slurry, and vacuum drying was performed for 12 h to prepare a working electrode; a lithium sheet was used as a counter electrode, a glass fiber membrane (purchased from the British Whatman company) was used as a separator, 1 mol/L LiPF$_6$ (the solvent was a mixed solution of ethylene carbonate and dimethyl carbonate in a volume ratio of 1:1) was used as an electrolyte, VC with a volume fraction of 1% and FEC with a volume fraction of 5% were added into the electrolyte, and a button battery was assembled in a German Braun inert gas glove box in an argon atmosphere.

Figure 8:
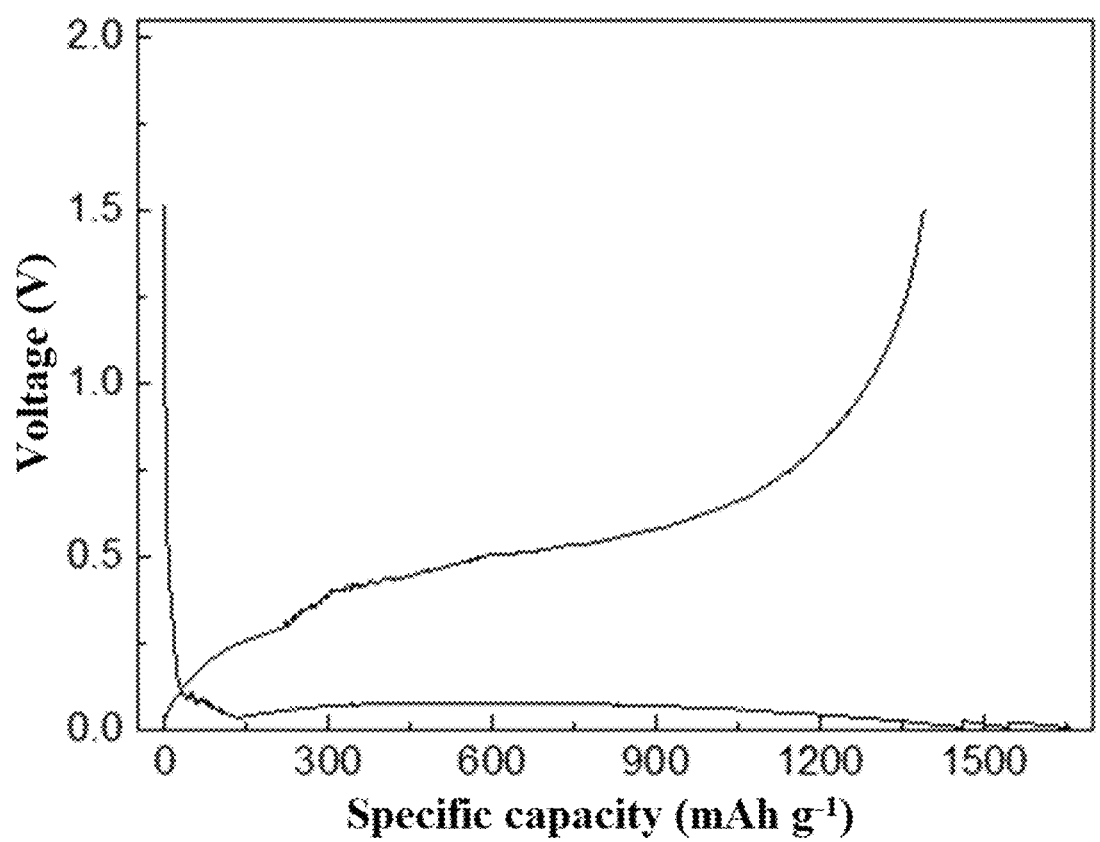
FIG. 8 is a charge-discharge curve of the modified silicon monoxide negative electrode material prepared in Embodiment 1.
Figure 9:
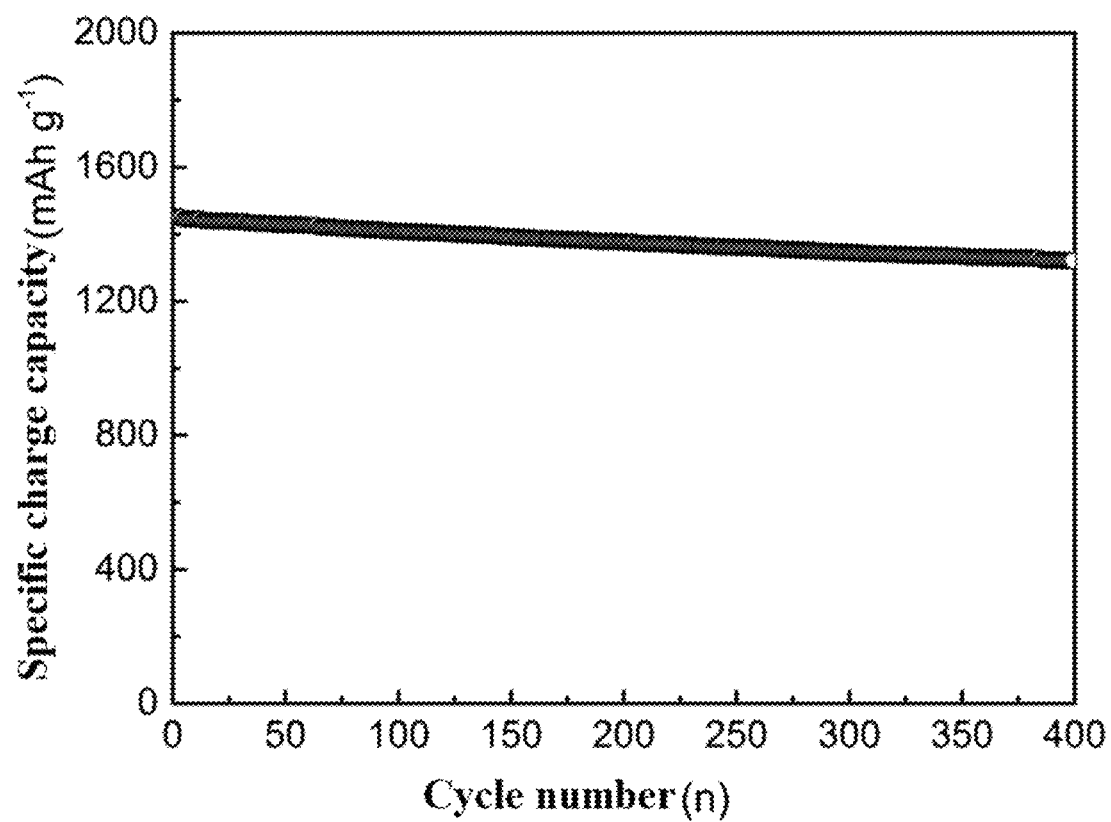
FIG. 9 is a cycle performance curve of the modified silicon monoxide negative electrode material prepared in Embodiment 1.

An electrochemical analysis test was carried out on the modified silicon monoxide material in Embodiment 1, and the result is shown in FIG. 8. When the modified silicon monoxide material is charged and discharged under the conditions that a charge-discharge interval is 0-1.5 V and a current density is 278 mA/g (0.2 C), the material capacity can reach 1389 mAh/g, the first-cycle Coulombic efficiency is 83.9%, FIG. 9 is a 400-cycle capacity retention rate curve of a battery, the capacity retention is as high as 91.3%, and the modified silicon monoxide material obtained by the present invention is proved to have relatively high capacity and excellent cycle performance. According to the above method, the negative electrode materials in other embodiments and comparative examples are subjected to charge and discharge tests, and the result is shown in the following table 1:

TABLE 1

|  | Initial reversible specific capacity (mAh/g) | Initial Coulombic efficiency (%) | 400-cycle capacity retention rate (%) |
| --- | --- | --- | --- |
| Embodiment 1 | 1449.3 | 87.3 | 91.3 |
| Embodiment 2 | 1389.3 | 85.9 | 86.1 |
| Embodiment 3 | 1419.7 | 85.2 | 85.2 |
| Embodiment 4 | 1375.1 | 85.7 | 82.6 |
| Embodiment 5 | 1215.2 | 88.4 | 87.4 |
| Embodiment 6 | 1436.8 | 87.2 | 86.8 |
| Embodiment 7 | 1386.6 | 88.1 | 90.6 |
| Embodiment 8 | 1422.3 | 82.9 | 78.9 |
| Embodiment 9 | 1365.7 | 81.9 | 83.2 |
| Embodiment 10 | 1442.0 | 86.5 | 88.7 |
| Embodiment 11 | 1349.3 | 85.1 | 84.2 |
| Embodiment 12 | 1475.9 | 84.5 | 83.2 |
| Comparative example 1 | 1568.6 | 83.2 | 63.3 |
| Comparative example 2 | 1523.4 | 81.3 | 64.2 |
| Comparative example 3 | 1423.6 | 77.9 | 56.8 |
| Comparative example 4 | 1320.6 | 72.7 | 63.4 |
| Comparative example 5 | 1369.1 | 76.9 | 68.7 |

In conclusion, the preparation method provided by the present invention is simple and efficient, and the obtained modified silicon monoxide material has high initial Coulombic efficiency, good rate capability and cycle performance and excellent electrochemical performance when being used as the negative electrode material of the lithium-ion battery.

The applicant declares that the detailed process equipment and the process flow of the present invention are explained through the above embodiments, but the present invention is not limited to the detailed process equipment and the process flow, that is, it does not mean that the present invention can be implemented only by depending on the detailed process equipment and the process flow. Those skilled in the art should understand that any improvement of the present disclosure, equivalent replacement of raw materials of the product of the present invention, addition of auxiliary components, selection of specific modes and the like fall within the protection range and the disclosure range of the present invention.

What is claimed is:

1. A preparation method of a modified silicon monoxide material, comprising the following steps:
   (1) uniformly mixing water with raw materials of silicon, silicon dioxide and metal silicate wherein the metal silicate is a mixture of $MgSiO_3$ and $Li_2Si_2O_5$ according to a mass ratio of from 4:2 to 6:1, performing spray drying to obtain raw material microspheres with uniformly distributed components, pressing the raw material microspheres into a raw material block, and drying the raw material block;
   (2) loading the raw material block into a vacuum furnace equipment with a condensation collection system, heating under a high-temperature of from 1200 to 1500° C. and a vacuum condition of from 1 to 50 Pa to vaporize the raw material block to form a silicon monoxide vapor and a metal steam, condensing and depositing the silicon monoxide vapor and the metal steam to obtain deposited blocks, wherein each of the deposited blocks comprises silicon-containing particles having metal silicate uniformly dispersed around the silicon and the silicon monoxide, and crushing the deposited blocks to obtain silicon-containing particles; and
   (3) carrying out carbon coating on the silicon-containing particles obtained from crushing the deposited blocks to form a carbon coating layer to obtain the modified silicon monoxide material, wherein in the modified silicon monoxide material, a carbon material coats surfaces of the silicon-containing particles.

2. The preparation method according to claim 1, wherein in the raw materials of the silicon, silicon dioxide and the metal silicate in the step (1) a molar ratio of a total amount of silicon element to an amount of oxygen element is 1:1.4 to 1:0.6.

3. The preparation method according to claim 2, wherein in the raw materials of the silicon, silicon dioxide and the metal silicate in the step (1) the molar ratio of the total amount of silicon element to the amount of oxygen element is 1:1.2 to 1:0.8.

4. The preparation method according to claim 2, wherein a molar ratio of the total amount of silicon element in the raw materials to the amount of metal elements in the metal silicate in the raw materials is 1:0.2 to 1:0.02.

5. The preparation method according to claim 4, wherein the molar ratio of the total amount of silicon element in the raw materials to the amount of metal elements in the metal silicate in the raw materials is 1:0.15 to 1:0.05.

6. The preparation method according to claim 1, wherein, in step (2), the deposited blocks are heated at 600-900° C. for 0.5-3 h before the crushing.

7. The preparation method according to claim 1, wherein, in step (3), the carbon material coats surfaces of the silicon-containing particles obtained from crushing the deposited blocks through vapor deposition and permeates into pores of the silicon-containing particles, and a thickness of the formed carbon coating layer is 1-20 nm.

8. The preparation method according to claim 7, wherein the thickness of the formed carbon coating layer is 5-15 nm.

9. The preparation method according to claim 1, wherein a mass percentage content of the carbon coating layer is 2-10 wt %, based on a total mass of the modified silicon monoxide being 100 wt %.

10. The preparation method according to claim 9, wherein the mass percentage content of the carbon coating layer is 4-8 wt %, based on a total mass of the modified silicon monoxide being 100 wt %.

* * * * *